US008533530B2

(12) United States Patent
Codrescu et al.

(10) Patent No.: US 8,533,530 B2
(45) Date of Patent: Sep. 10, 2013

(54) METHOD AND SYSTEM FOR TRUSTED/UNTRUSTED DIGITAL SIGNAL PROCESSOR DEBUGGING OPERATIONS

(75) Inventors: Lucian Codrescu, Austin, TX (US); William C. Anderson, Austin, TX (US); Suresh Venkumahanti, Austin, TX (US); Louis Achille Giannini, Berwyn, IL (US); Manojkumar Pyla, San Diego, CA (US); Xufeng Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 734 days.

(21) Appl. No.: 11/560,332

(22) Filed: Nov. 15, 2006

(65) Prior Publication Data

US 2008/0115011 A1    May 15, 2008

(51) Int. Cl.
  *G06F 11/00*    (2006.01)
(52) U.S. Cl.
  USPC ............................................. 714/21; 726/21
(58) Field of Classification Search
  None
  See application file for complete search history.

(56) References Cited

U.S. PATENT DOCUMENTS

| | | | |
|---|---|---|---|
| 4,080,650 A | 3/1978 | Beckett | |
| 4,669,059 A | 5/1987 | Little et al. | |
| 4,901,307 A | 2/1990 | Gilhousen et al. | |
| 5,093,914 A | 3/1992 | Coplien et al. | |
| 5,103,459 A | 4/1992 | Gilhousen et al. | |
| 5,136,717 A * | 8/1992 | Morley et al. | 712/16 |
| 5,544,311 A | 8/1996 | Harenberg et al. | |
| 5,551,043 A | 8/1996 | Crump et al. | |
| 5,944,841 A | 8/1999 | Christie | |
| 5,951,696 A * | 9/1999 | Naaseh et al. | 714/34 |
| 6,018,759 A | 1/2000 | Doing et al. | |
| 6,029,248 A | 2/2000 | Clee et al. | |
| 6,052,708 A | 4/2000 | Flynn et al. | |
| 6,067,588 A | 5/2000 | Ito | |
| 6,106,571 A | 8/2000 | Maxwell | |

(Continued)

FOREIGN PATENT DOCUMENTS

| | | |
|---|---|---|
| EP | 1411434 A2 | 4/2004 |
| JP | 2183362 A | 7/1990 |

(Continued)

OTHER PUBLICATIONS

Microsoft Press Computer Dictionary Third Edition, "operating system", Microsoft Press, 1997, p. 341.*

(Continued)

*Primary Examiner* — Gabriel Chu
(74) *Attorney, Agent, or Firm* — Peter Michael Kamarchik; Nicholas J. Pauley; Joseph Agusta

(57) ABSTRACT

Techniques for the design and use of a digital signal processor, including (but not limited to) for processing transmissions in a communications (e.g., CDMA) system. Trusted and untrusted debugging operational control occurs in operating a core processor associated with the digital signal processor. A debugging process within a debugging mechanism associates with the core processor. The core processor process determines the origin of debugging control as trusted debugging control or untrusted debugging control. In the event of trusted debugging control, the core processor process provides to the trusted debugging control a first set of features and privileges. Alternatively, in the event that debugging control is untrusted debugging control, the core processor process provides the untrusted debugging control a second restricted set of features and privileges, all for maintaining security and proper operation of the core processor process.

30 Claims, 9 Drawing Sheets

(56) References Cited

U.S. PATENT DOCUMENTS

| | | | |
|---|---|---|---|
| 6,199,181 B1* | 3/2001 | Rechef et al. | 714/38 |
| 6,202,172 B1 | 3/2001 | Ponte | |
| 6,212,544 B1 | 4/2001 | Borkenhagen et al. | |
| 6,226,749 B1* | 5/2001 | Carloganu et al. | 726/2 |
| 6,249,907 B1 | 6/2001 | Carter et al. | |
| 6,314,530 B1 | 11/2001 | Mann | |
| 6,341,347 B1 | 1/2002 | Joy et al. | |
| 6,343,371 B1 | 1/2002 | Flanagan et al. | |
| 6,467,054 B1 | 10/2002 | Lenny | |
| 6,480,818 B1 | 11/2002 | Alverson et al. | |
| 6,532,553 B1 | 3/2003 | Gwilt et al. | |
| 6,567,839 B1 | 5/2003 | Borkenhagen et al. | |
| 6,665,802 B1 | 12/2003 | Ober | |
| 6,684,348 B1 | 1/2004 | Edwards et al. | |
| 6,697,935 B1 | 2/2004 | Borkenhagen et al. | |
| 6,708,270 B1 | 3/2004 | Mayer | |
| 6,714,958 B1 | 3/2004 | Tudor | |
| 6,757,829 B1* | 6/2004 | Laczko et al. | 713/187 |
| 6,798,713 B1* | 9/2004 | Yearsley et al. | 365/238.5 |
| 6,832,334 B2 | 12/2004 | Wojcieszak et al. | |
| 6,834,360 B2 | 12/2004 | Corti et al. | |
| 6,915,416 B2 | 7/2005 | Deng et al. | |
| 6,981,261 B2 | 12/2005 | Kalafatis et al. | |
| 7,003,703 B2 | 2/2006 | Chun | |
| 7,013,400 B2 | 3/2006 | Kalla et al. | |
| 7,020,871 B2 | 3/2006 | Bernstein et al. | |
| 7,047,451 B2 | 5/2006 | Agarwala et al. | |
| 7,055,139 B2 | 5/2006 | Balle et al. | |
| 7,073,059 B2* | 7/2006 | Worely et al. | 713/168 |
| 7,076,804 B2* | 7/2006 | Kershenbaum et al. | 726/30 |
| 7,080,289 B2 | 7/2006 | Swaine et al. | |
| 7,093,236 B2 | 8/2006 | Swaine et al. | |
| 7,131,114 B2 | 10/2006 | Nguyen et al. | |
| 7,185,319 B2 | 2/2007 | Kaler et al. | |
| 7,203,926 B2 | 4/2007 | Bogle et al. | |
| 7,210,064 B2 | 4/2007 | Mayer | |
| 7,213,134 B2 | 5/2007 | Soltis, Jr. | |
| 7,222,262 B2 | 5/2007 | Prasadh et al. | |
| 7,254,716 B1* | 8/2007 | Giles et al. | 713/189 |
| 7,278,058 B1 | 10/2007 | Narisi | |
| 7,318,017 B2 | 1/2008 | Swoboda | |
| 7,321,957 B2 | 1/2008 | Khan et al. | |
| 7,360,117 B1 | 4/2008 | Boike et al. | |
| 7,369,954 B2 | 5/2008 | Levine et al. | |
| 7,370,210 B2 | 5/2008 | Symes | |
| 7,380,112 B2 | 5/2008 | Okabayashi et al. | |
| 7,380,276 B2* | 5/2008 | Saha et al. | 726/22 |
| 7,383,537 B2 | 6/2008 | Darweesh et al. | |
| 7,383,540 B2 | 6/2008 | Kalra | |
| 7,421,571 B2 | 9/2008 | Shoemaker | |
| 7,437,619 B2 | 10/2008 | McCullough et al. | |
| 7,461,407 B2* | 12/2008 | Little et al. | 726/27 |
| 7,472,378 B2 | 12/2008 | Bennett et al. | |
| 7,475,303 B1 | 1/2009 | Edgar et al. | |
| 7,512,954 B2 | 3/2009 | Srivastava et al. | |
| 7,577,878 B2 | 8/2009 | Baradie et al. | |
| 7,594,146 B2 | 9/2009 | Horikawa et al. | |
| 7,600,221 B1 | 10/2009 | Rangachari | |
| 7,657,791 B2 | 2/2010 | Codrescu et al. | |
| 7,657,875 B2 | 2/2010 | Alexander, III | |
| 7,770,155 B2 | 8/2010 | Bates et al. | |
| 7,770,156 B2 | 8/2010 | Thekkath | |
| 7,823,131 B2 | 10/2010 | Gard et al. | |
| 7,890,316 B2 | 2/2011 | Swoboda et al. | |
| 7,917,907 B2 | 3/2011 | Ahmed et al. | |
| 8,136,097 B2 | 3/2012 | Konishi et al. | |
| 8,196,109 B2 | 6/2012 | Fung et al. | |
| 8,239,838 B2 | 8/2012 | Yim et al. | |
| 2002/0004933 A1 | 1/2002 | Dzoba et al. | |
| 2002/0035721 A1 | 3/2002 | Swoboda | |
| 2002/0065646 A1 | 5/2002 | Waldie et al. | |
| 2002/0099977 A1 | 7/2002 | Wong | |
| 2003/0014643 A1* | 1/2003 | Asami et al. | 713/182 |
| 2003/0037226 A1 | 2/2003 | Tsuruta et al. | |
| 2003/0061550 A1 | 3/2003 | Ng et al. | |
| 2003/0065963 A1 | 4/2003 | Gregg | |
| 2003/0074650 A1 | 4/2003 | Akgul et al. | |
| 2003/0135720 A1 | 7/2003 | Dewitt, Jr. et al. | |
| 2004/0024995 A1 | 2/2004 | Swaine | |
| 2004/0103397 A1 | 5/2004 | Agarwala et al. | |
| 2004/0103398 A1 | 5/2004 | Agarwala et al. | |
| 2004/0117768 A1 | 6/2004 | Chang et al. | |
| 2004/0123274 A1 | 6/2004 | Inagaki et al. | |
| 2004/0133823 A1 | 7/2004 | Swoboda et al. | |
| 2004/0170046 A1 | 9/2004 | Belnet et al. | |
| 2004/0170168 A1 | 9/2004 | Dedek | |
| 2004/0177269 A1* | 9/2004 | Belnet et al. | 713/200 |
| 2004/0260910 A1 | 12/2004 | Watt et al. | |
| 2005/0034024 A1 | 2/2005 | Alverson et al. | |
| 2005/0108689 A1 | 5/2005 | Hooper et al. | |
| 2005/0177703 A1 | 8/2005 | Norden et al. | |
| 2005/0177819 A1 | 8/2005 | Ober et al. | |
| 2005/0188358 A1 | 8/2005 | Johnson et al. | |
| 2005/0246691 A1 | 11/2005 | Hsieh et al. | |
| 2005/0268168 A1 | 12/2005 | Ishihara | |
| 2006/0026594 A1 | 2/2006 | Yoshida et al. | |
| 2006/0048099 A1* | 3/2006 | Templin et al. | 717/124 |
| 2006/0069953 A1 | 3/2006 | Lippett et al. | |
| 2006/0129999 A1 | 6/2006 | Hiraoka et al. | |
| 2006/0179281 A1 | 8/2006 | Jensen et al. | |
| 2006/0184835 A1 | 8/2006 | Al-Omari et al. | |
| 2006/0206902 A1 | 9/2006 | Jamil et al. | |
| 2006/0212759 A1 | 9/2006 | Campbell et al. | |
| 2006/0248394 A1 | 11/2006 | McGowan | |
| 2006/0248395 A1 | 11/2006 | McGowan | |
| 2006/0248401 A1 | 11/2006 | Carroll et al. | |
| 2006/0253894 A1* | 11/2006 | Bookman et al. | 726/2 |
| 2006/0259831 A1 | 11/2006 | Sohm et al. | |
| 2006/0279439 A1 | 12/2006 | Swoboda | |
| 2006/0282419 A1 | 12/2006 | Sen et al. | |
| 2006/0282734 A1* | 12/2006 | Milne et al. | 714/742 |
| 2007/0016959 A1* | 1/2007 | Ikeda et al. | 726/27 |
| 2007/0043861 A1 | 2/2007 | Baron et al. | |
| 2007/0089095 A1 | 4/2007 | Thekkath et al. | |
| 2007/0180333 A1 | 8/2007 | Thekkath et al. | |
| 2007/0180431 A1 | 8/2007 | Agarwala et al. | |
| 2007/0220360 A1 | 9/2007 | Weinert et al. | |
| 2007/0234306 A1 | 10/2007 | Klinger et al. | |
| 2007/0240125 A1 | 10/2007 | Degenhardt et al. | |
| 2007/0271461 A1* | 11/2007 | Hardy et al. | 713/176 |
| 2007/0288906 A1 | 12/2007 | Agarwala et al. | |
| 2008/0010640 A1 | 1/2008 | Foo | |
| 2008/0027961 A1 | 1/2008 | Arlitt | |
| 2008/0028196 A1 | 1/2008 | Kailas | |
| 2008/0034350 A1 | 2/2008 | Conti | |
| 2008/0052681 A1 | 2/2008 | Yang | |
| 2008/0059963 A1 | 3/2008 | Foo | |
| 2008/0080651 A1 | 4/2008 | Edgar | |
| 2008/0098207 A1 | 4/2008 | Reid et al. | |
| 2008/0114972 A1 | 5/2008 | Codrescu et al. | |
| 2008/0115113 A1 | 5/2008 | Codrescu et al. | |
| 2008/0115115 A1 | 5/2008 | Codrescu et al. | |
| 2008/0209176 A1 | 8/2008 | Singh et al. | |
| 2008/0256339 A1 | 10/2008 | Xu et al. | |
| 2008/0256396 A1 | 10/2008 | Giannini et al. | |
| 2008/0288808 A1 | 11/2008 | Moyer | |
| 2009/0007076 A1 | 1/2009 | Al-Omari et al. | |
| 2009/0132863 A1 | 5/2009 | Ashfield et al. | |
| 2009/0199162 A1 | 8/2009 | Choi et al. | |

FOREIGN PATENT DOCUMENTS

| | | |
|---|---|---|
| JP | 04145544 | 5/1992 |
| JP | 8055023 A | 2/1996 |
| JP | 08087366 A | 4/1996 |
| JP | 09167105 A | 6/1997 |
| JP | 2001154873 A | 6/2001 |
| JP | 2001519947 A | 10/2001 |
| JP | 2001331340 A | 11/2001 |
| JP | 2001521215 T | 11/2001 |
| JP | 2003177938 A | 6/2003 |
| JP | 2004171563 A | 6/2004 |
| JP | 2004171564 A | 6/2004 |
| JP | 2006285430 A | 10/2006 |
| KR | 20010031167 | 4/2001 |

| | | |
|---|---|---|
| KR | 20060049710 | 5/2006 |
| TW | I226757 B | 1/2005 |
| TW | I228929 B | 3/2005 |
| TW | 200625070 | 7/2006 |
| WO | WO9921089 | 4/1999 |
| WO | WO0068780 | 11/2000 |
| WO | 0118651 | 3/2001 |
| WO | WO2006030195 | 3/2006 |

OTHER PUBLICATIONS

Hartvigsen, J., et al.; "Juag/Debug Interface"; Motorola Technical Developments, Motorola Inc., Schaumburg, Illinois, US; vol. 19, Jun. 1, 1993; pp. 107-109.

International Search Report—PCT/US07/084530, International Search Authority-European Patent Office—Sep. 22, 2008.

Written Opinion—PCT/US07/084530, International Search Authority-European Patent Office—Sep. 22, 2008.

"Processor-Controlled Battery Back-Up Power Supply Architecture" IBM Technical Disclosure Bulletin, IBM Corp. New York, US, vol. 31, No. 3, (Aug. 1, 1988), pp. 183-185, XP000119002, ISSN: 0018-8689.

"Technique for Power Management in Signal Processors" IBM Technical Disclosure Bulletin, IBM Corp. New York, US, vol. 35, No. 5, (Oct. 1, 1992), pp. 425-427, XP000313036.

Qian, Y. et al.: "Cycle accurate thread timer for linux environment" Performance Analysis of Systems and Software, 2001. ISPASS. 2001 IEEE International Symposium on Nov. 4-6, 2001, Piscataway, NJ, USA, IEEE, Nov. 4, 2001, pp. 38-44, XPOI0583886 ISBN: 978-0-7695-7230-7 * abstract * * p. 40, left-hand column, line 5-line *13 * p. 42, left-hand column, line 10-line 23 *.

"Universal Mobile Telecommunications Systems (UMTS)" ETSI TS 125.305, European Telecommunications Standard Institute, Sophia-Antipo, FR, vol. 3-R2, No. V6.1.0, Jun. 2004, XP014016761.

Wu, C. et al.: "Trace-based analysis and tuning for distributed parallel applications" Parallel and Distributed Systems, 1994. International Conference on Hsinchu, Taiwan Dec. 19-21, 1994, Los Alamitos, CA, USA,IEEE Comput. Soc, Dec. 19, 1994, pp. 716-723, XPOI0223604 ISBN: 978-0-8186-6555-4 * the whole document*.

Jiang, "Enhancing System-on-Chip Verification Using Embedded Test Structures", Dec. 2005, pp. 1-61.

Vermeulen et al., "Core-Based Scan Architecture for Silicon Debug", IEEE, 2002, pp. 638-647.

ARM Limited, Embedded Trace Macrocell 9—Technical Reference Manual, 2002, 164 pages, <http://rtds.cs.tamu.edu/web_462/techdocs/ARM/debug/DDI0157F_ETM9_r2p2.pdf>.

Blair Fort, et al., "A Multithreaded Soft Processor for SOPC Area Reduction", IEEE International Symposium on Custom Computing Machines, Napa, CA, Oct. 2006, IEEE computer society, pp. 131-142.

Kreuzinger J, et al: "Context-Switching Techniques for Decoupled Multithreaded Processors" Euromicroconference, 1999, Proceedings. 25th Milan, Italy Sep. 8-10, 1999, Los Alamitos, CA, USA, IEEE Comput, Soc, US, vol. 1, (Sep. 8, 1999), pp. 248-251.

Ungerer Theo, "A Survey of Processors With Explicit Multithreading, Mar. 2003 (29-63)," ACM Computing Survey, 2003, 35 (1).

Andrews et al, "Xbox 360 system Architecture", 2006.

Compan et al., GENVIEW: A Portable Source-Level Debugger for Macrocell Generators, 1991, 5 pages, <http://ieeexplore.ieee.org/stamp/stamp.jsp?tp=&arnumber=206436&userType=inst>.

Mayer et al., Debug support, Clibration and Emulation for Multiple Processor and Powertrain Control SoCs, 2005, 5 pages, <http://ieeexplore.ieee.org/stamp/stamp.jsp?arnumber=01395811>.

Rootselaar et al., "Debugging of system-on-a-chip", 1997.

Vermeulen et al., "Silicon Debug of a Co-processor Array for Video Applications",2000.

Camera et al.,"An integrated debugging environment for reprogrammable hardware systems", Sep. 2005, pp. 111-115, <http://delivery.acm.org/1 0.1145/1090000/1 085145/p111-camera.pdf>.

Vermeulen B., et al., "Automatic generation of breakpoint hardware for silicon debug", Jun. 2004, pp. 514-517,<http://delivery.acm.org/1 0.1145/1 000000/996708/p514-vermeulen.pdf>.

* cited by examiner

| REGISTER NAME | DESCRIPTION | REGISTER ADDRESS | ISDB TRUSTED ACCESS | ISDB UNTRUSTED ACCESS | CORE ACCESS SUPERVISOR MODE[a] |
|---|---|---|---|---|---|
| ISDBST | ISDB STATUS | 0x0 | R | R[b] | R |
| ISDBCFG0 | ISDB CONFIG 0 | 0x1 | R/W | NONE | NONE |
| ISDBCFG1 | ISDB CONFIG 1 | 0x2 | R/W | NONE | NONE |
| BRKPTINFO | BREAKPOINT INFO | 0x3 | R | NONE | NONE |
| BRKPTINC0 | BREAKPOINT 0 ADDRESS | 0x4 | W | NONE | NONE |
| BRKPTING0 | BREAKPOINT 0 CONFIG | 0x5 | W | NONE | NONE |
| BRKPTINC1 | BREAKPOINT 1 ADDRESS | 0x6 | W | NONE | NONE |
| BRKPTING1 | BREAKPOINT 1 CONFIG | 0x7 | W | NONE | NONE |
| STFINST | STUFF INSTRUCTION | 0x8 | W | NONE | NONE |
| ISDBMBXIN | MAILBOX IN (ISDB->CORE) | 0x9 | R | W | R |
| ISDBMXOUT | MAILBOX IN (CORE-->ISDB) | 0xA | W | R | W |
| ISDBCMD | ISDB COMMAND | 0xB | W | W[c] | NONE |
| ISDB_EN | ISDB ENABLE | 0xC | R/W | R/W | NONE |
| ISDB_VERSION | ISDB VERSION | 0xD | R | R | NONE |
| ISDB_GPR | ISDB GENERAL PURPOSE REGISTER | 0xF | R/W | NONE | R/W |

[a] NO ACCESS IS ALLOWED FROM THE CORE IN USER MODE
[b] ONLY BITS 4:0 ARE VISIBLE IN UNTRUSTED MODE
[c] ONLY THE INTERRUPT COMMAND IS AVAILABLE

FIG. 9

METHOD AND SYSTEM FOR TRUSTED/UNTRUSTED DIGITAL SIGNAL PROCESSOR DEBUGGING OPERATIONS

RELATED APPLICATION

This application is related to the following co-pending United States Patent application numbers: application Ser. No. 11/560,217, filed Nov. 15, 2006, entitled NON-INTRUSIVE, THREAD-SELECTIVE, DEBUGGING METHOD AND SYSTEM FOR A MULTI-THREADED DIGITAL SIGNAL PROCESSOR; U.S. patent application Ser. No. 11/560,323, filed Nov. 15, 2006, entitled METHOD AND SYSTEM FOR A DIGITAL SIGNAL PROCESSOR DEBUGGING DURING POWER TRANSITIONS; U.S. patent application Ser. No. 11/560,339, filed Nov. 15, 2006, entitled EMBEDDED TRACE MACROCELL FOR ENHANCED DIGITAL SIGNAL PROCESSOR DEBUGGING OPERATIONS; and U.S. patent application Ser. No. 11/560,344, filed Nov. 15, 2006, entitled METHOD AND SYSTEM FOR INSTRUCTION STUFFING OPERATIONS DURING NON-INTRUSIVE DIGITAL SIGNAL PROCESSOR DEBUGGING.

FIELD

The disclosed subject matter relates to data processing systems and processes such as may find use in data communications and similar applications. More particularly, this disclosure relates to a novel and improved method and system for permitting and controlling trusted and untrusted digital signal processor debugging operations.

DESCRIPTION OF THE RELATED ART

Increasingly, telecommunications and other types of electronic equipment and supporting video, complex audio, videoconferencing and other rich software applications involve signal processing. Signal processing requires fast mathematical calculations and data generation in complex, but repetitive algorithms. Many applications require computations in real-time, i.e., the signal is a continuous function of time, which must be sampled and converted to digital signals for numerical processing. The processor must execute algorithms performing discrete computations on the samples as they arrive.

The architecture of a digital signal processor (DSP) is optimized to handle such algorithms. The characteristics of a good signal processing engine include fast, flexible arithmetic computation units, unconstrained data flow to and from the computation units, extended precision and dynamic range in the computation units, dual address generators, efficient program sequencing, and ease of programming.

One promising application of DSP technology includes communications systems such as a code division multiple access (CDMA) system that supports voice and data communications, as well as text messaging and other applications, between users over a satellite or terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459 entitled "SYSTEM AND METHOD FOR GENERATING WAVEFORMS IN A CDMA CELLULAR TELEHANDSET SYSTEM," both assigned to the assignee of the claimed subject matter.

A CDMA system is typically designed to conform to one or more standards. One such first generation standard is the "TIA/EIA/IS-95 Terminal-Base Station Compatibility Standard for Dual-Mode Wideband Spread Spectrum Cellular System," hereinafter referred to as the IS-95 standard. The IS-95 CDMA systems are able to transmit voice data and packet data. A newer generation standard that may more efficiently transmit packet data is offered by a consortium named the "$3^{rd}$ Generation Partnership Project" (3GPP) and embodied in a set of documents including Document Nos. 3G TS 25.211, 3G TS 25.212, 3G TS 25.213, and 3G TS 25.214, which are readily available to the public. The 3GPP standard is hereinafter referred to as the W-CDMA Standard.

Complex DSP operational software employing the W-DCMA Standard, for example, requires robust development tools. Such development tools may include those for code generation, integration, testing, debugging, and evaluating application performance. In developing and operating software or complex DSP applications, such as advanced telecommunications applications, there is the need for sophisticated, yet non-intrusive debugging software. That is, debugging software applications must be not only sufficiently robust to monitor, test, and support the correction of software defects and operational problems, but also they may operate so as not to interfere with the core processor software during debugging operations. Otherwise, any problems in the core processing software may not be detected or detected properly during the use of such debugging software.

Such non-intrusive debugging operations may include performing trusted and untrusted debugging operations and the ability to perform instruction stuffing operations. Trusted users include software developers at the kernel and application level, while untrusted users may include OEMs, third party developers, end users, and others who may intentionally or unintentionally (yet inappropriately) affect essential operations of the DSP operating system and other essential programs. In a programmable core, the operating system is the manager of security concerns and understands which resources, registers, memory locations, devices, and services are allowed for various users. Accordingly, a process for determining a user to be either a trusted or untrusted user may coordinate tightly with the determination that the operating system may make in addressing different security needs.

There is a need, therefore, for a debugging process and system for operation with a DSP, which debugging process and system provides the ability to determine a user to be a trusted or an untrusted user.

A need exists for a non-intrusive software debugging process capable of selectably operating in either a trusted or an untrusted mode for permitting various types of configuration and breakpoint determinations and permissions.

Yet a further need exists for a debugging system capable of operating with trusted and untrusted users, which system makes use of the security management functions of a DSP core processor operating system.

SUMMARY

Techniques for providing non-intrusive, thread-selective, debugging method and system for a digital signal processor, including a multi-threaded digital signal processor, are disclosed, which techniques permit selectably operating in trusted or untrusted debugging modes. The method and system here disclosed improve both the operation of a digital signal processor and the efficient use of digital signal processor instructions for increasingly powerful software applications, including applications operating in personal computers, personal digital assistants, wireless handsets, and similar electronic devices, as well as increasing the associated digital processor speed and service quality.

According to one aspect of the disclosed subject matter, a method and system for controlling between trusted and untrusted debugging operational modes includes the processes, circuitry, and instructions for operating a core processor process within a core processor associated with the digital signal processor. The method and system further operate a debugging process within a debugging mechanism of the digital signal processor, which debugging mechanism associates with the core processor. The core processor process determines the origin of debugging control as trusted debugging control or untrusted debugging control. In the event that debugging control is trusted debugging control, the core processor process provides to the trusted debugging control a first set of features and privileges. Alternatively, in the event that debugging control is untrusted debugging control, the core processor process provides the untrusted debugging control a second restricted set of features and privileges. As such, the disclosed software debugging method and system maintain security in the operation of the core processor process according to the determination of the debugging control as untrusted debugging control or untrusted debugging control.

These and other advantages of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGUREs and detailed description. It is intended that all such additional systems, methods, features and advantages be included within this description, be within the scope of the accompanying claims.

BRIEF DESCRIPTIONS OF THE DRAWINGS

The features, nature, and advantages of the disclosed subject matter may become more apparent from the detailed description set forth below when taken in conjunction with the drawings in which like reference characters identify correspondingly throughout and wherein.

Figure 3:
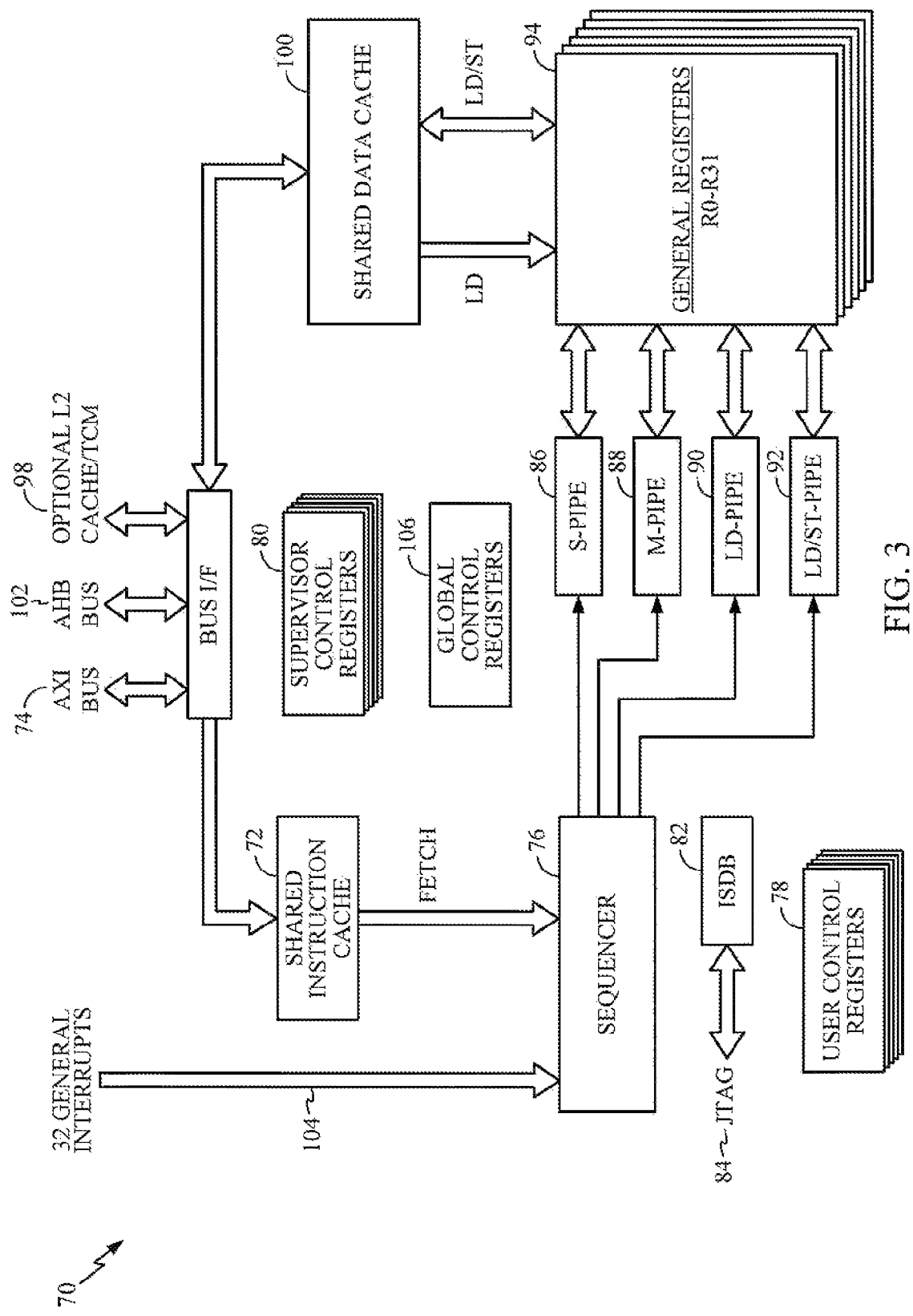
Figure 4:
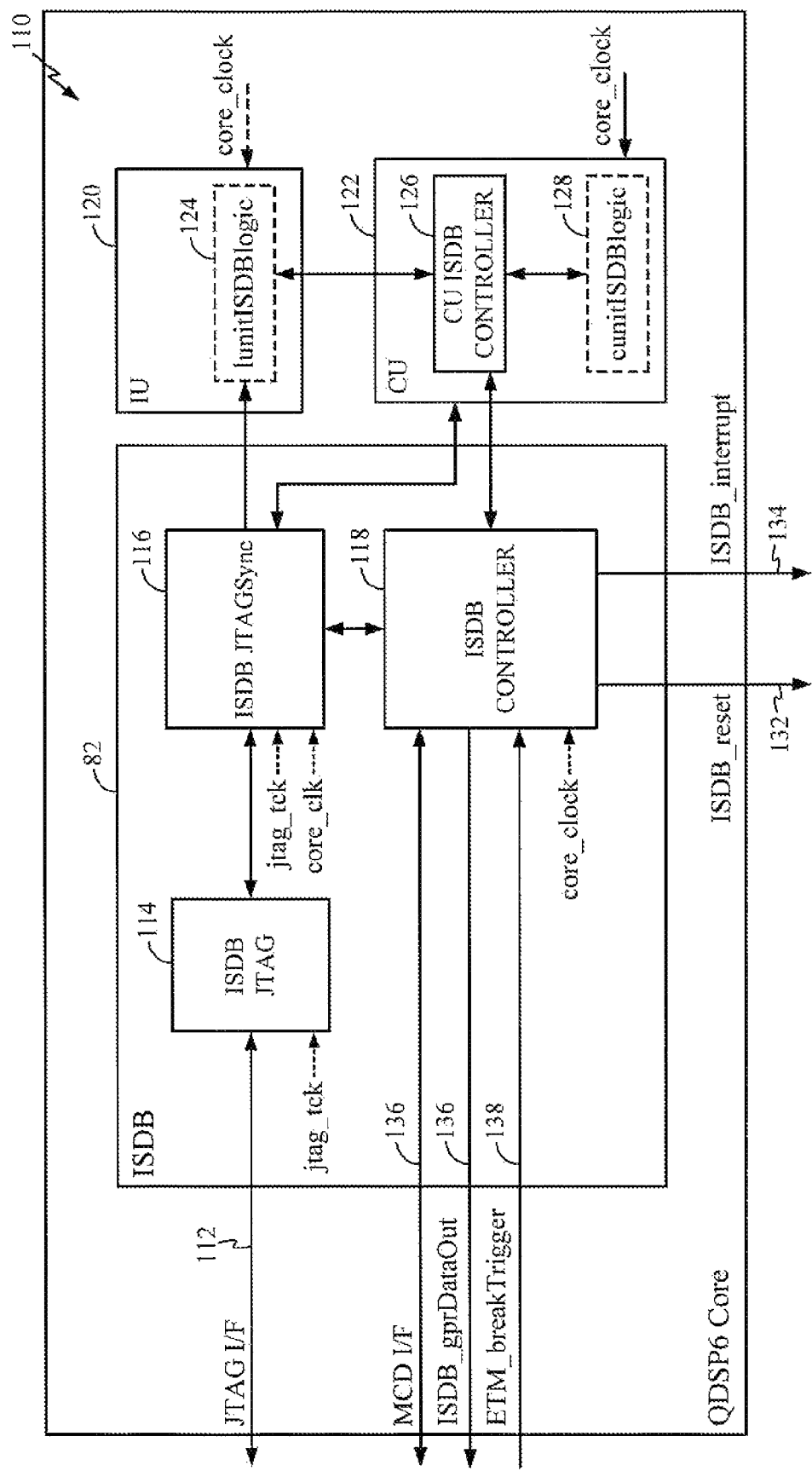
Figure 5:
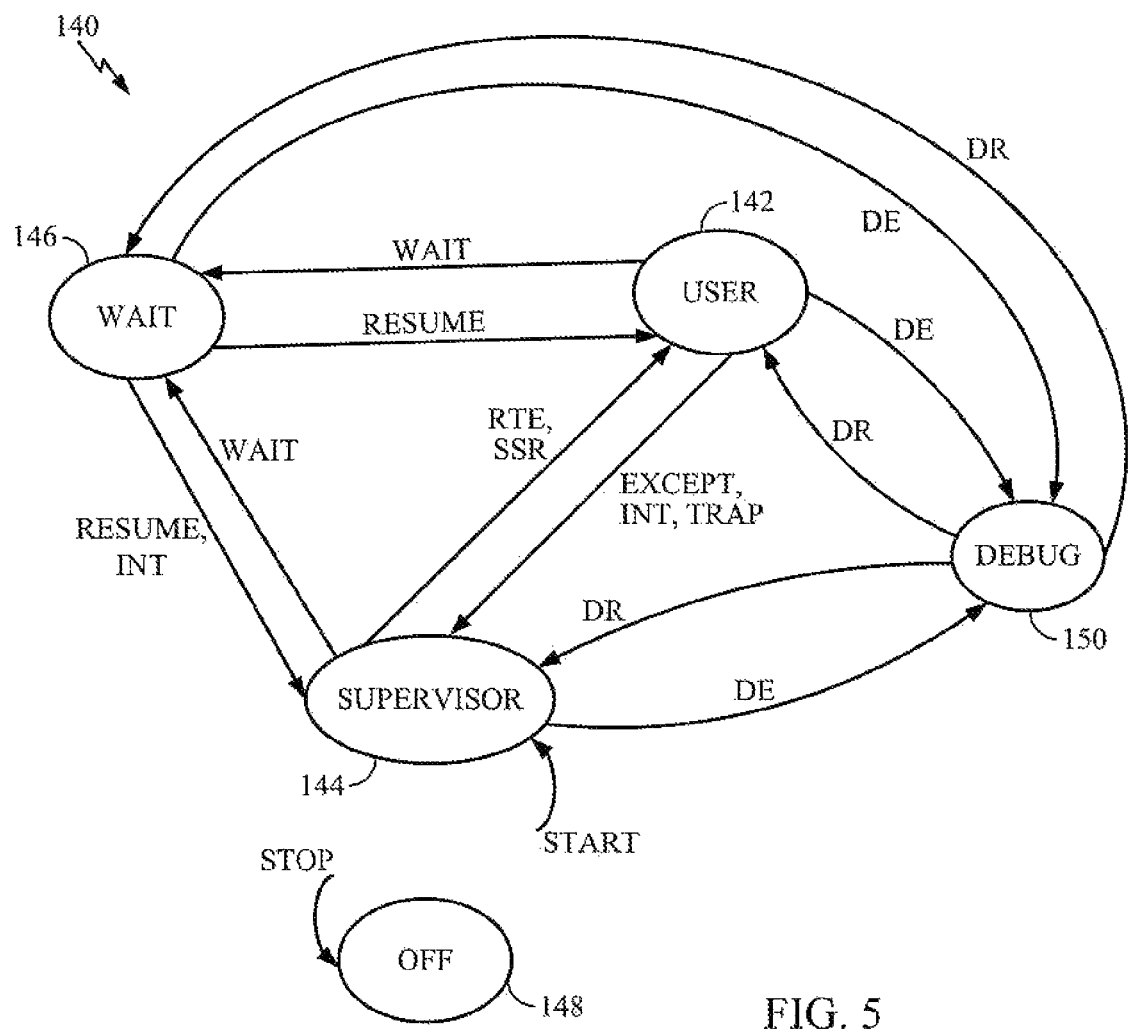
Figure 6:
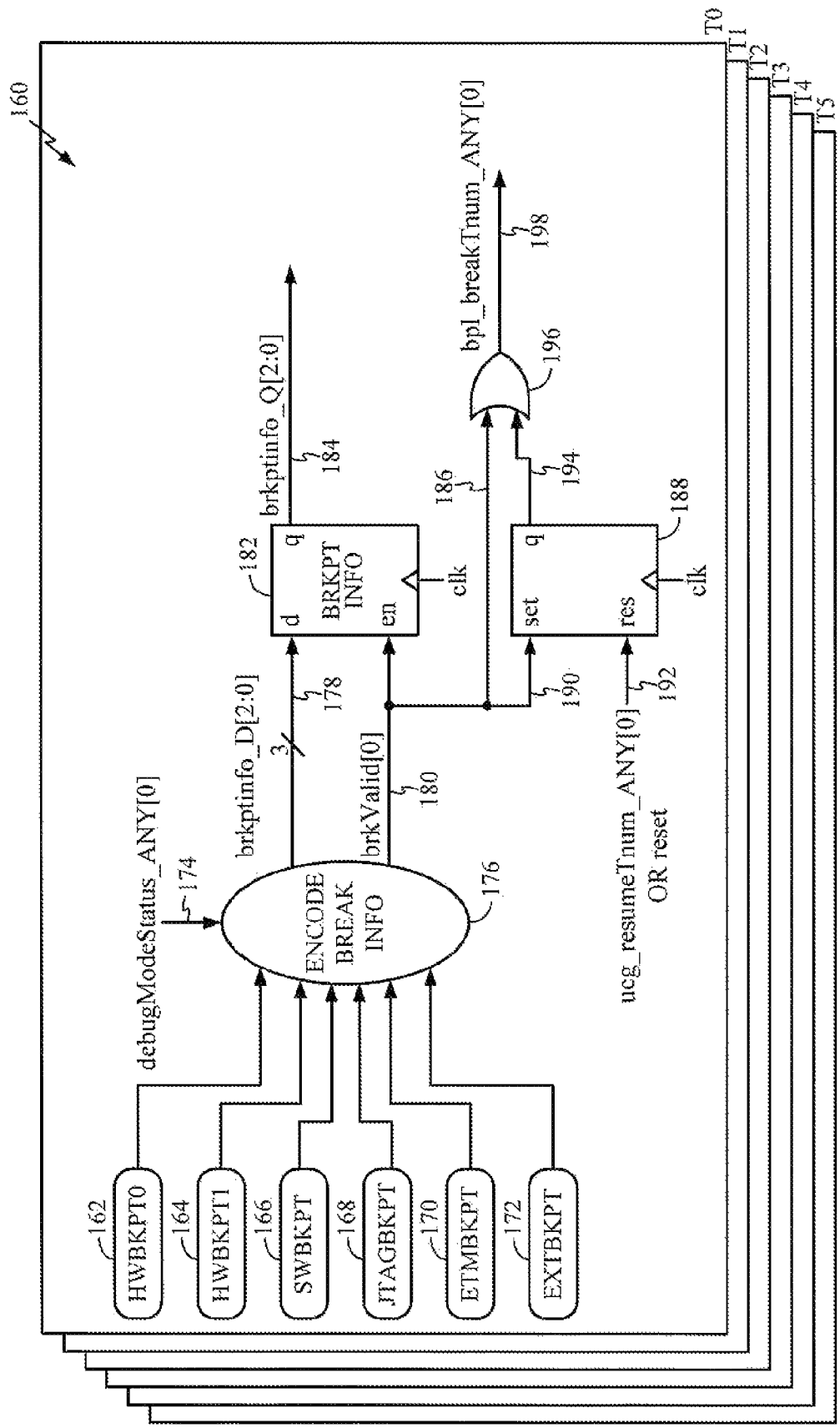
Figure 7:
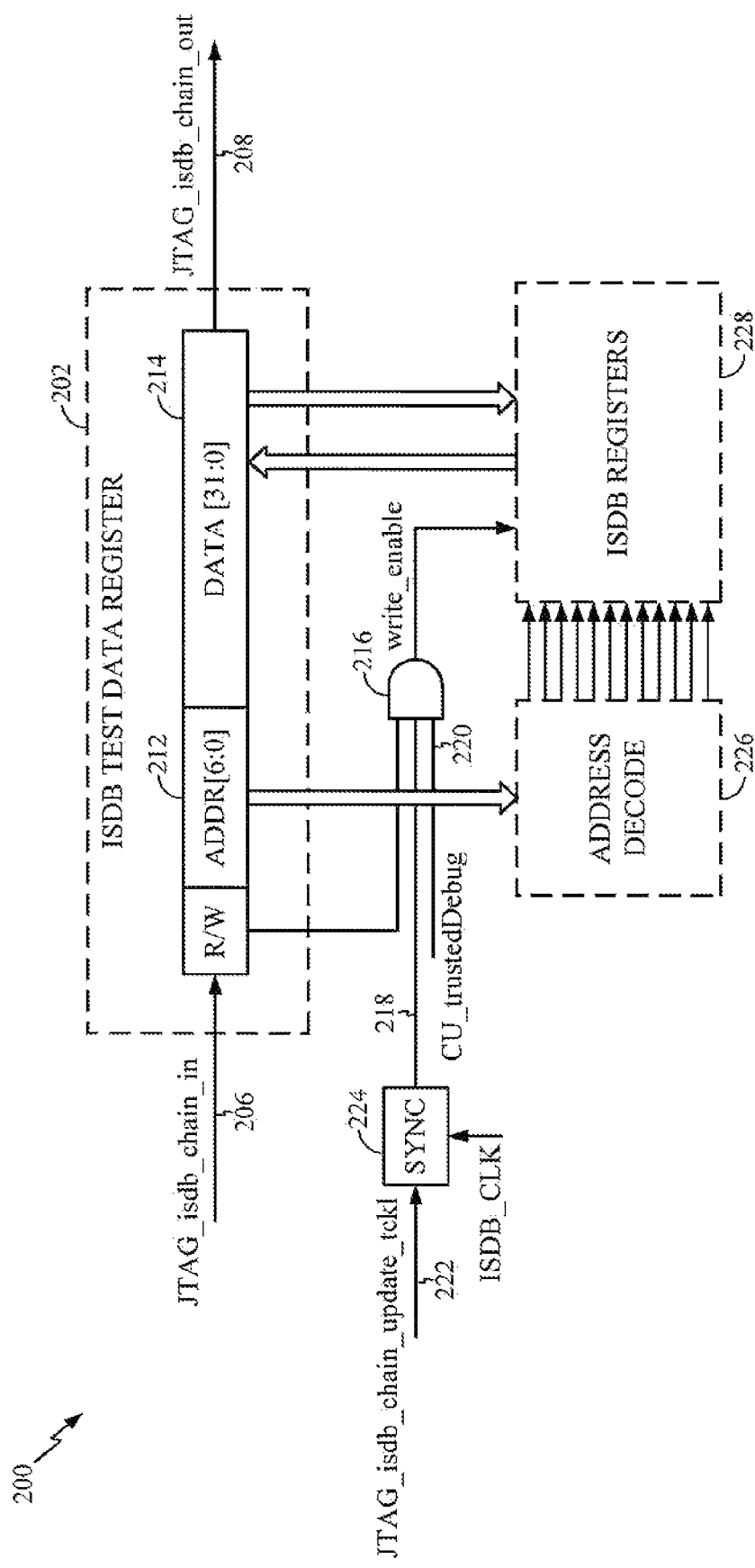
Figure 8:
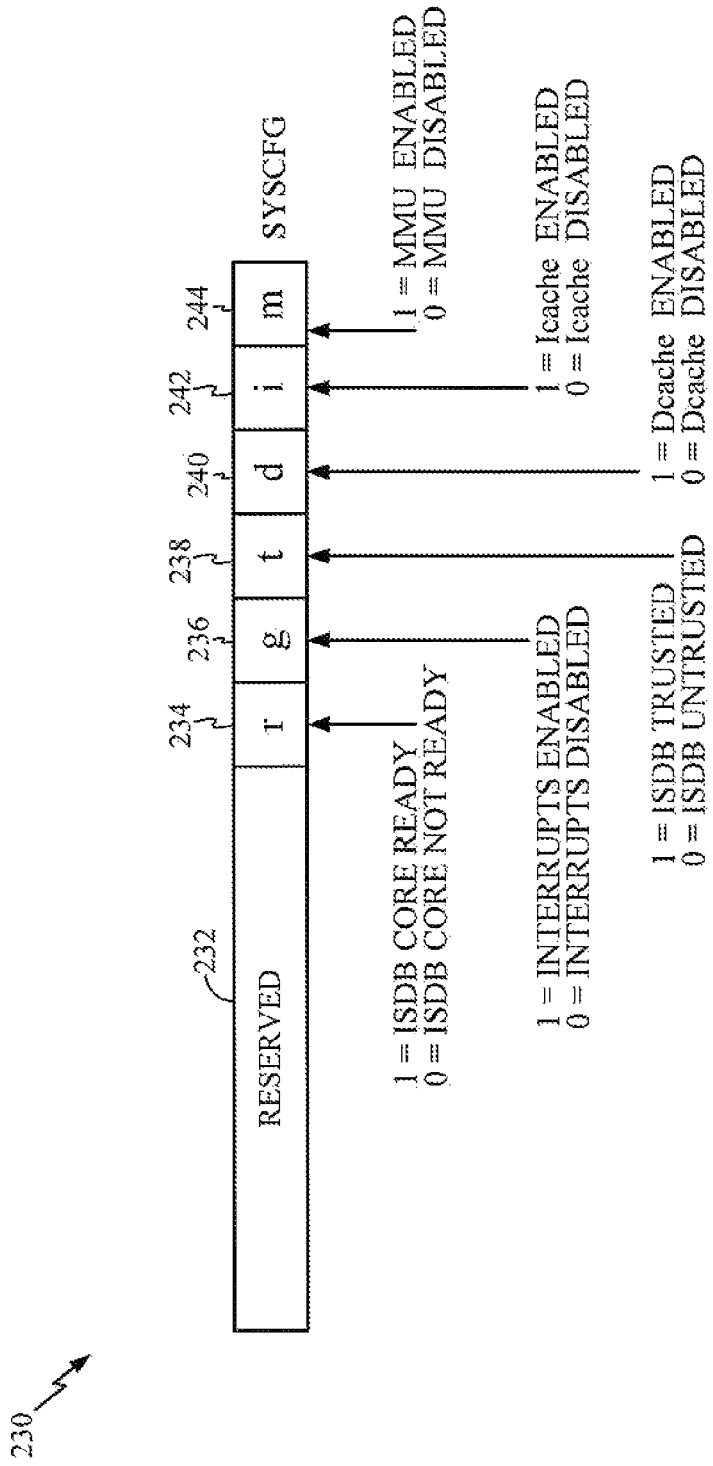

FIG. 3 provides an architecture block diagram of one embodiment of a multi-threaded digital signal processor incorporating the technical advantages of the presently disclosed subject matter;

FIG. 4 discloses certain aspects of a digital signal processor core applying the ISDB/JTAG interface features of the present disclosure;

FIG. 5 presents a process flow diagram applicable to the operating modes of the digital signal processor, including the debugging mode of operation to which the present disclosure pertains;

FIG. 6 depicts a breakpoint processing scheme applicable to one embodiment of the present disclosure;

FIG. 7 shows an aspect of an ISDB JTAGSync circuit for performing the trusted/untrusted debugging procedures here disclosed; and FIG. 8 illustrates one way of forming a digital signal processor system configuration register for providing the trusted/untrusted debugging operations herein described; and FIG. 9 is a table of ISDB control registers for the various ISDB functions herein described together with trusted/untrusted and core access supervisor access modes.

DETAILED DESCRIPTION OF THE SPECIFIC EMBODIMENTS

Figure 1:
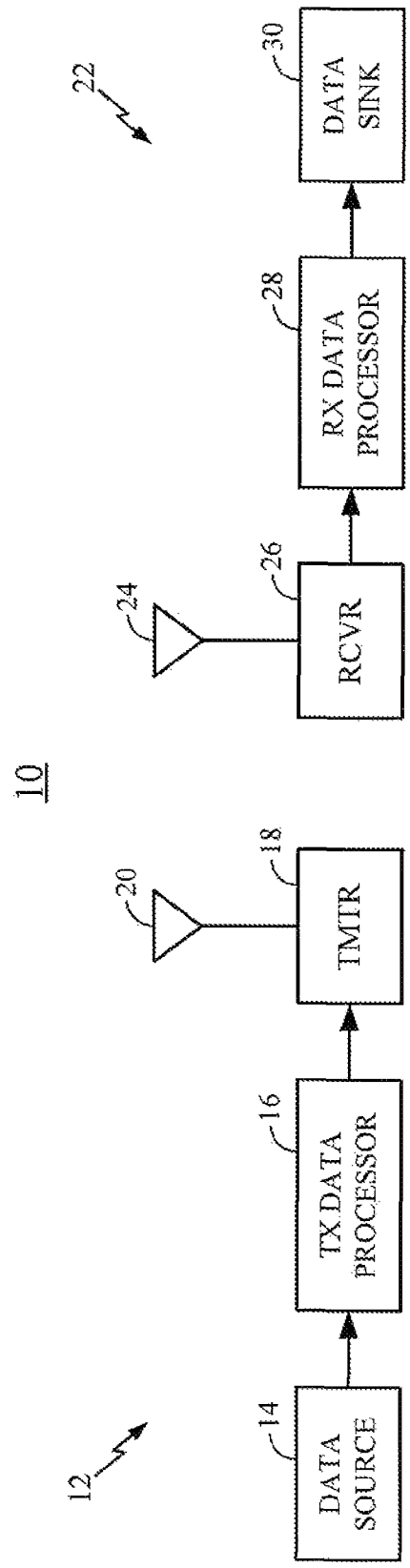
FIG. 1 is a simplified block diagram of a communications system that may implement one of the various embodiments here disclosed.

The disclosed subject matter for a non-intrusive, thread-selective, debugging method and system for a multi-threaded digital signal processor has application for multi-threaded processing of any type for which the benefits here presented may be advantageous. One such application appears in telecommunications and, in particular, in wireless handsets that employ one or more digital signal processing circuits. For explaining how such a wireless handset may be used, FIG. 1 provides a simplified block diagram of a communications system 10 that may implement the presented embodiments of the disclosed interrupt processing method and system. At a transmitter unit 12, data is sent, typically in blocks, from a data source 14 to a transmit (TX) data processor 16 that formats, codes, and processes the data to generate one or more analog signals. The analog signals are then provided to a transmitter (TMTR) 18 that modulates, filters, amplifies, and up converts the baseband signals to generate a modulated signal. The modulated signal is then transmitted via an antenna 20 to one or more receiver units.

At a receiver unit 22, the transmitted signal is received by an antenna 24 and provided to a receiver (RCVR) 26. Within receiver 26, the received signal is amplified, filtered, down converted, demodulated, and digitized to generate in phase (I) and (Q) samples. The samples are then decoded and processed by a receive (RX) data processor 28 to recover the transmitted data. The decoding and processing at receiver unit 22 are performed in a manner complementary to the coding and processing performed at transmitter unit 12. The recovered data is then provided to a data sink 30.

The signal processing described above supports transmissions of voice, video, packet data, messaging, and other types of communication in one direction. A bi-directional communications system supports two-way data transmission. However, the signal processing for the other direction is not shown in FIG. 1 for simplicity. Communications system 10 may be a code division multiple access (CDMA) system, a time division multiple access (TDMA) communications system (e.g., a GSM system), a frequency division multiple access (FDMA) communications system, or other multiple access communications system that supports voice and data communication between users over a terrestrial link. In a specific embodiment, communications system 10 is a CDMA system that conforms to the W-CDMA Standard.

Figure 2:
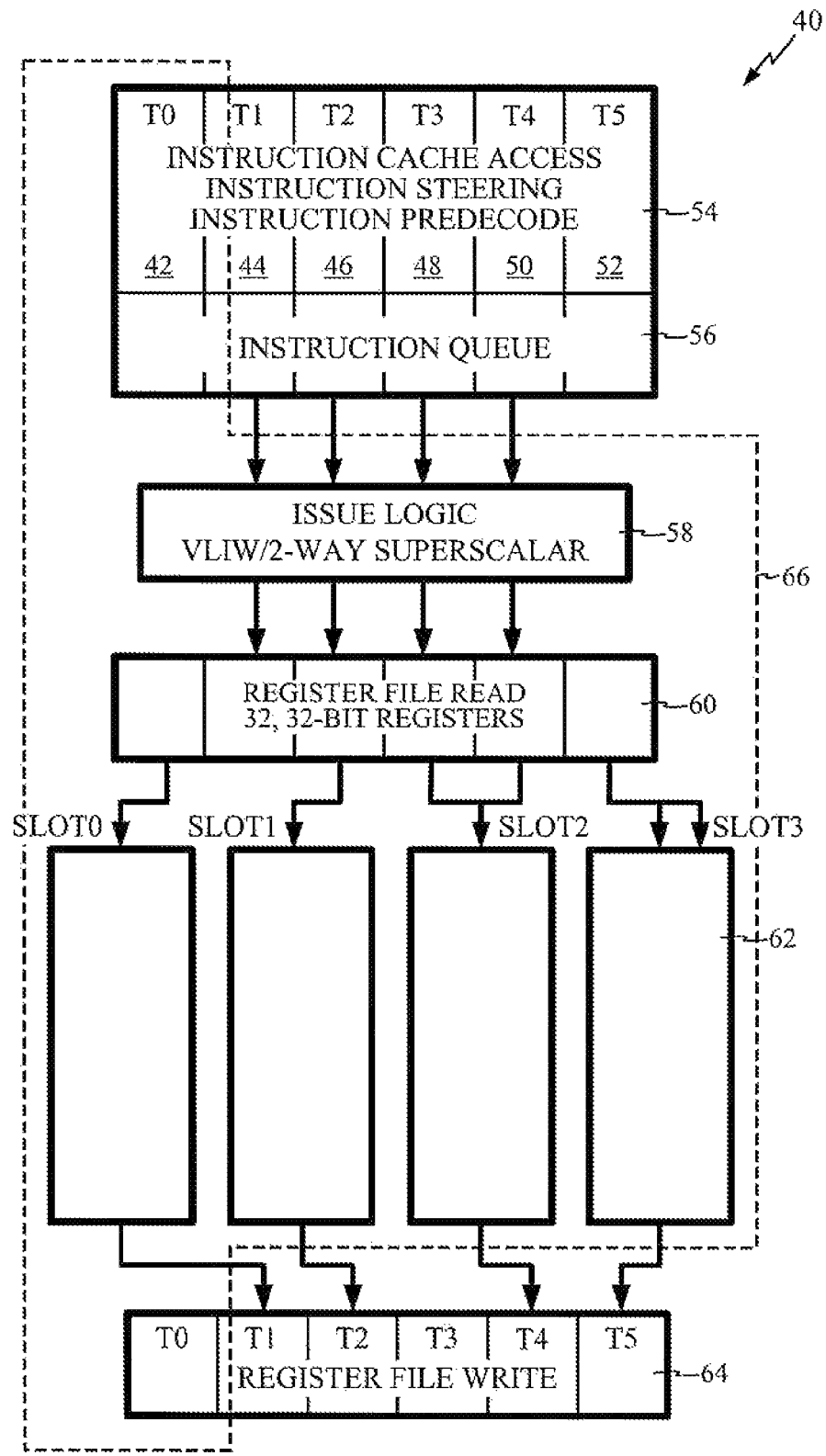
FIG. 2 illustrates a DSP architecture for carrying forth the teachings of the present disclosure.

FIG. 2 illustrates DSP 40 architecture that may serve as the transmit data processor 16 and receive data processor 28 of FIG. 1. We emphasize that DSP 40 only represents one embodiment among a great many of possible digital signal processor embodiments that may effectively use the teachings and concepts here presented. In DSP 40, therefore, threads T0:T5 (reference numerals 42 through 52), contain sets of instructions from different threads. Circuit 54 represents the instruction access mechanism and is used for fetching instructions for threads T0:T5. Instructions for circuit 54 are queued into instruction queue 56. Instructions in instruction queue 56 are ready to be issued into processor pipeline 66 (see below). From instruction queue 56, a single thread, e.g., thread T0, may be selected by issue logic circuit 58. Register file 60 of a selected thread is read and read data is sent to execution data paths 62 for SLOT0:SLOT3. SLOT0:SLOT3, in this example, provide for the packet grouping combination employed in the present embodiment.

Output from execution data paths 62 goes to register file write circuit 64, also configured to accommodate individual threads T0:T5, for returning the results from the operations of DSP 40. Thus, the data path from circuit 54 and before to register file write circuit 64 forms a processing pipeline 66. The present embodiment may employ a hybrid of a heterogeneous element processor (HEP) system using a single processor with up to six threads, T0:T5. Processor pipeline 66 has six stages, which matches the minimum number of processor cycles necessary to fetch a data item from circuit 54 to registers 60 and 64. DSP 40 concurrently executes instructions of different threads T0:T5 within a processor pipeline 66. That is, DSP 40 provides six independent program counters, an internal tagging mechanism to distinguish instructions of threads T0:T5 within processor pipeline 66, and a mechanism that triggers a thread switch. Thread-switch overhead varies from zero to only a few cycles.

DSP 40, therefore, provides a general-purpose digital signal processor designed for high-performance and low-power across a wide variety of signal, image, and video processing applications. FIG. 3 provides a brief overview of the DSP 40 architecture, including some aspects of the associated instruction set architecture for one manifestation of the disclosed subject matter. Implementations of the DSP 40 architecture support interleaved multithreading (IMT). In this execution model, the hardware supports concurrent execution of multiple hardware threads T0:T5 by interleaving instructions from different threads in the pipeline. This feature allows DSP 40 to include an aggressive clock frequency while still maintaining high core and memory utilization. IMT provides high throughput without the need for expensive compensation mechanisms such as out-of-order execution, extensive forwarding networks, and so on. Moreover, the DSP 40 may include variations of IMT, such as those variations and novel approaches disclosed in the commonly-assigned U.S. patent applications by M. Ahmed, et al, and entitled "Variable Interleaved Multithreaded Processor Method and System" and "Method and System for Variable Thread Allocation and Switching in a Multithreaded Processor."

FIG. 3, in particular, provides a core processing architecture 70 block diagram for DSP 40 as applied to a single thread that may employ the teachings of the disclosed subject matter. Block diagram 70 depicts shared instruction cache 72 which receives instructions via Bus interface (I/F) 73 from AXI Bus 74, which instructions include mixed 16-bit and 32-bit instructions. These instructions reach to sequencer 76, user control register 78, and supervisor control register 80 of threads T0:T5. The core-level system architecture of the disclosed subject matter also includes in-silicon debugging system (ISDB) 82, which interfaces core processor 70 via JTAG interface 84, both of which are described in more detail below.

Sequencer 76 provides hybrid two-way superscalar instructions and four-way VLIW instructions to S-Pipe unit 86, M-Pipe unit 88, LD[Load]-Pipe 90, and LD/ST[Store]-Pipe unit 92, all of which communicate with general registers 94. AXI Bus 74 also communicates via Bus I/F 73 with shared data cache 96 LD/ST instructions to threads T0:T5. Optional L2 Cache/TCM 98 signals include LD/ST instructions with shared data TCM 100, which LD/ST instructions further flow to threads General Registers 94. From AHB peripheral bus 102 MSM specific controller 104 communicates interrupts with T0:T5, including interrupt controller instructions, debugging instructions, and timing instructions. Global control registers 106 communicates control register instructions with threads T0:T5.

DSP 40, therefore, includes six virtual DSP cores, each containing global control registers 106 and private supervisor control registers 80. Global control registers 106 are shared between all threads. Each thread shares a common data cache and a common instruction cache. Load, store, and fetch operations are serviced by a common bus interface. High performance AXI bus 74 and a lower performance AHB bus 102 are used to connect the data and instruction traffic to off-core memory and peripherals. An integrated level two memory (cache and/or TCM) input 98 is optional. Peripheral access may be through memory-mapped loads and stores. The physical address partition between AHB and AXI may be configured at the MSM level.

Clearly, the presented architecture for DSP 40 may evolve and change over time. For example, the number of instruction caches that DSP 40 may use could change from six to one, or other numbers of caches. Superscalar dispatch, L1 data at TCM 100, and other architectural aspects may change. However, the present subject matter may have continued relevance in a wide variety of configurations and for a large family of modifications of DSP 40.

ISDB 82, through JTAG interface 84, provides a hardware debugger for DSP 40. ISDB 82 provides software debug features through JTAG interface 84 by sharing system or supervisor-only registers, that are divided into supervisor control registers 80 on a per thread basis, as well as global control registers 106 between all threads. The system control registers are used for per thread interrupt and exception control and per thread memory management activities. Global registers allow interacting with the ISDB 82 for debugging operations.

ISDB 82 enables software developers to debug their software while DSP 40 operates. ISDB 82 hardware, in combination with a software debugger program operating in ISDB 82, may be used to debug the DSP 40 operating system software. ISDB 82 supports debugging hardware threads individually. Users may suspend thread execution, view and alter thread registers, view and alter instruction and data memory, single step threads, stuff instructions to threads, and resume thread execution. Trusted users have access to all of ISDB 82 features, while untrusted users have access to a subset of features.

ISDB 82 may interface with a debugger interface card to communicate with ISDB 82 debugging software residing on a program counter, yet all through JTAG interface 84. Host debugger software may interact with the ISDB 82 by reading and writing ISDB control registers. Communication, for example, may be through a 40-bit packet which identifies the ISDB register to which read/write is to occur, as well as a 32-bit data payload. A packet format supporting this operation may be up to 64 control registers which may be 32 bits wide each.

ISDB 82 includes a trusted register for controlling security during a debugging operation. If the ISDB 82 trusted is set, then all ISDB 82 registers are visible to the debugger software, and all ISDB commands are available for use. In the case that ISDB trusted is cleared, then ISDB 82 only permits a restricted set of operations. These aspects of the present disclosure appear in more detail below.

Certain ISDB 82 registers may be made visible to core software. These are accessible via SUPERVISOR mode control register transfer instructions. The core instructions include a breakpoint instruction. When ISDB trusted is set, this instruction causes the executing thread to enter a debugging operational mode. This transition shifts thread control to ISDB 82. In addition to the thread that executed a breakpoint, other threads may optionally enter DEBUG mode 150 according to ISDB 82 programming. If ISDB 82 is not trusted or not enabled, this instruction is treated as a NOP. Preferably, the breakpoint instruction is the only instruction in a packet.

FIG. 4 shows important aspects of ISDB/JTAG interface 110 between the debugging mechanism and the core processor of the disclosed subject matter. In association with DSP 40 core architecture 70, ISDB 82 communicates with JTAG 84 via path JTAG interface path 112, from ISDB JTAG circuit 114. ISDB JTAG circuit 114 processes data flows between JTAG 84 and ISDB 82. ISDB JTAG circuit 114 further interfaces ISDB JTAGSync circuit 116. ISDB JTAGSync circuit 116 communicates further with ISDB controller 118, instruction unit (IU) 150 and control unit (CU) 122. Particularly, ISDB JTAGSync circuit 116 interfaces IU ISDB logic circuit of IU 150 and CU ISDB Controller 126 of CU 122. CU ISDB controller 126 communicates with CU ISDB logic circuit 128, as well as ISDB controller 118. Control outputs from ISDB controller 118 include ISDB data output 130, ISDB reset signal 132, and ISDB interrupt 134. Further interfaces to ISDB controller 118 include MCD interface 136 and ETM break trigger 138.

Having listed the various components of ISDB 82 what follow are a brief operational description and introduction to the constituent parts of the control or logic circuitry for performing non-intrusive trusted and untrusted debugging operations of DSP 40. ISDB controller 118 handles a variety of tasks, including (a) implementing various ISDB registers; (b) synchronizing the MCD external break and resume triggers and the ETM break trigger to DSP 40 before they are forwarded to CU 122 for further processing; (c) generating MCD break and resume triggers based on debug mode status of core; and (d) adding a pipeline stage for signals sent out to DSP 40 sub-system, such as ISDB interrupt, break event etc.

CU 122 includes circuitry and instructions capable of handling the tasks such as (a) processing breakpoints and generating break triggers to each thread; (b) generating micro-break and micro-resume commands; (c) maintaining ISDB 82 status and mailbox registers; and (d) implementing the certain ISDB 82 registers. CU 122 includes a breakpoint processing logic (BPL) block as appears in FIG. 6 for processing all the breakpoints and generating a macro break request to a micro-command generator of CU ISDB controller 126. The micro-command generator processes the macro break request along with instruction stuff commands, instruction step and resume commands and issues micro-break and resume commands to CU 122 for pipeline control.

CU ISDB controller 128 maintains the state of ISDB 82 based on the break and resume acknowledge signals received back. The mailbox functions of CU ISDB controller 126 maintain mailbox registers used for communication between the host debug software and the DSP 40 core processor. These mailbox functions also contain ISDB 82 status registers.

FIG. 5 presents a processing mode diagram 140 for the various mode control aspects of DSP 40, including operations of ISDB 82 during debugging processes. In FIG. 5, DSP 40 supports processing modes that are both global to all threads and local to individual threads. Each DSP 40 hardware thread individually supports two execution modes, USER mode 142 and SUPERVISOR mode 144, and three non-processing modes of WAIT mode 146, OFF mode 148, and DEBUG mode 150, all as may appear in FIG. 5. The mode of a thread is independent of other threads, for example one thread may be in WAIT mode 146 while another is in USER mode 142, and so on.

The per-thread mode state diagram of FIG. 5 is supported by various instructions or events. These include "Except" or internal exception event, an "Int" or external interrupt event, an "RTE" or software return instruction from exception mode, and "SSR" or update to SSR register instruction, a "Stop" or software stop instruction that may be entered from any mode, a "Start" or software Start Instruction that also may be entered from any mode, a "trap" or software Trap Instruction, a "Wait" or software wait Instruction, a "Resume" or software Resume Instruction, a "DE" or Debug Event, and a "DR" or Debug Instruction. While the functions in different implementations of the claimed subject matter may vary slightly from those here presented, the meanings of "Start," "Wait," "Resume," "DE," and/or "DR" may be given their broadest interpretations consistent with the scope of the claimed subject matter.

Registers are available in DSP 40 in both USER mode 142 and SUPERVISOR mode 144. The user-mode registers are divided into a set of general registers and a set of control registers. General registers are used for all general purpose computation including address generation, scalar and vector arithmetic. Control registers support special-purpose functionality such as hardware loops, predicates, etc. General purpose registers are 32 bits wide and may be accessed as single registers or as aligned pairs of two registers. The general register file provides all operands for instructions, including addresses for load/store, data operands for numeric instructions, and vector operands for vector instructions.

DEBUG mode 150 provides a special state where the thread is waiting for commands from ISDB 82. Whenever an ISDB Debug Event occurs, such as by the execution of a software breakpoint instruction, a break command from ISDB 82, or occurrence of a hardware breakpoint, indicated threads may enter DEBUG mode 150. While in DEBUG mode 150, the core is controlled by ISDB 82 via commands from JTAG interface 84. When the ISDB 82 releases the thread due to execution of a resume command, the thread may resume operation according to their current mode settings. When a thread is in DEBUG mode 150, it is controlled by ISDB 82 and cannot be controlled by other threads. A Wait, Resume, Start, or Stop instruction from a running thread, targeting a thread in DEBUG mode 150, may be ignored. Similarly, a Non-Maskable Interrupt (NMI) may be ignored by threads in DEBUG mode 150.

A HARDWARE RESET mode (not shown in FIG. 5) and DEBUG mode 150 are global to all threads. Whenever the hardware reset pin is asserted, regardless of any thread's processing state, DSP 40 may enter HARDWARE RESET Mode. In HARDWARE RESET mode, all registers are set to their reset values. No processing may occur until the hardware reset pin is de-asserted. When the reset pin is asserted, the processor may transition into reset mode and all registers may be reset to their HARDWARE RESET values. After the reset pin is de-asserted, thread T0 may be given a soft reset interrupt. This may cause thread T0 to enter SUPERVISOR mode 144 and begin executing at the reset vector location. All other threads may remain off. At this point, the software is free to control mode transitions for each thread individually.

In FIG. 6, it is seen that BPL circuit 160 of CU ISDB controller 126 (FIG. 4) includes break triggers from six different sources, including hardware breakpoints 0/1 (HWBKPT0 162 and HWBKPT1 164), software breakpoint (SWBKPT 166), JTAG 84 breakpoint (JTAGBKPT 168), ETM (embedded trace macro) breakpoint (ETMBKPT 170), and external breakpoint (EXTBKPT 172). Break trigger 162 through 172 and debug mode status input 174 go to encode break encoder 176 to cause DSP 40 to operate in DEBUG mode 150. Output from encoder 176 includes three (3) breakpoint information bits 178 and a breakpoint valid bit 180. Breakpoint information data 178 enters breakpoint information circuit 182 to cause a breakpoint information JTAG interface command 184. Breakpoint bit 180 also generates OR gate input 186 and reset circuit 188 input. Reset circuit 188 receives either a UCG resume thread number or a reset input 192 to generate reset control output 194 into OR gate 196. Either valid bit 186 or reset output 194 may cause OR gate 196 to generate BPL 160 breakpoint output 198.

The break triggers in BPL circuit 160 are processed along with the corresponding TNUM mask to generate macro break trigger to each of the threads. The macro break trigger 198, bpl_breakTnum_ANY[0], is maintained until the corresponding thread is resumed. The number of pipeline stages that can be used in BPL 160 is driven by hardware breakpoints which are precise breakpoints, i.e., the instruction that triggers hardware breakpoint match must not be executed. The thread switches to debug mode after executing the program until that instruction. The disclosed embodiment provides a macro break trigger one cycle after the break triggers arrive. For that reason the breakValid input 176 is logically OR'ed with its latched version input 192 to generate bpl_breakTnum_ANY[0] output 198.

Through the use of breakpoints, the six threads of DSP 40 may individually enter and exit DEBUG mode 150. A breakpoint trigger may come from five sources which correspond to the five different types of breakpoints supported in ISDB 82. Upon hitting a breakpoint, a thread transitions from its current mode (e.g., WAIT/RUN) to DEBUG mode 150. In DEBUG mode 150, the thread waits for commands from ISDB 82. A thread in OFF mode 148 is powered down and may not accept any commands from ISDB 82. The latency of entering DEBUG mode 150 is implementation defined, such as in the present disclosure as relating to the event a power collapse. For example, an implementation may choose to complete a given operation, for example finish an outstanding load request, before entering DEBUG mode 150. In one embodiment, a thread identifier register contains an 8-bit read/write field and is used for holding a software thread identifier. This field is used by the hardware debugger to match breakpoints.

There are a number of different ways to enter a breakpoint process. For example, for HWBKPT1 162 and HWBKPT2 164 breakpoints, if a register equals a predetermined value, then when the program counter (PC) matches the predetermined value, then the process goes into the DEBUG mode 150. ASIDs (Address Space Identifiers) are tags similar to process IDs in a process or a particular thread in a multi-threaded process. So, physical address, virtual address, ASID, PC, or other qualifiers may be used to optionally obtain a fix of the location of the program in a space at which point a breakpoint may occur. The uses of breakpoints here referenced are more particularly disclosed in the commonly-assigned U.S. patent applications by L. Codrescu, et al, and entitled NON-INTRUSIVE, THREAD-SELECTIVE, DEBUGGING METHOD AND SYSTEM FOR A MULTI-THREADED DIGITAL SIGNAL PROCESSOR. The disclosed subject matter provides a path for moving into a DEBUG mode 150 in the event of a breakpoint such as those of FIG. 6. The disclosed subject matter controls which thread or sets of threads in the DSP 40 go into the DEBUG mode 150.

The presently disclosed method and system for performing trusted and untrusted debugging operations provide various levels of security that may be applied during both internally and externally controlled debugging operations. Because debugging operations potentially expose critical DSP 40 software to the source of the debugging actions, there is the need to know and control who may perform debugging operations. For trusted debugging operations, complete access to the software and its operation is possible. For necessary untrusted operations, e.g., from a not-fully-trusted third party, only limited access to the software and, perhaps, memory and registers is possible.

In general, ISDB 82 users may be classified as trusted and untrusted users. Trusted users may include known software developers, e.g., those creating kernel and application level programs, while untrusted users may include OEMs, third party developers, end users, etc. In DSP 40, the operating system for core processor 70 is the manager of security concerns and understands which resources, registers, memory locations, devices, and services are allowed for various users. The DSP 40 operating system allows untrusted users to debug their applications according to the value of a supervisor-only core control (ISDB_TRUSTED) bit that only the operating system may set. If the ISDB use is trusted, all features and privileges are allowed. The ISDB can perform any instruction in supervisor mode.

To demonstrate illustrative circuitry for performing the presently disclosed trusted and untrusted debugging operations, FIG. 7 includes ISDB JTAGSync circuit 200. ISDB JTAGSync circuit 200 includes an ISDB test data register 202 which DSP 40 may use to read and write the ISDB control registers. ISDB JTAGSync circuit 200 provides the synchronization logic between the ISDB test data register 202 operating on DB_tck and the ISDB control registers 204 operating in the DSP 40 clock domain. By reading and writing the ISDB control registers, DSP 40 performs various debug tasks supported by the ISDB 82.

In the implementation of FIG. 7, ISDB JTAGSync circuit 200 receives JTAG_isdb_chain_in signal 206 into ISDB Test Data Register 204 to generate JTAG_isdb_chain_out signal 208. ISDB Test Data Register 202 includes read/write (R/W) bits 210, Address bits [6:0] 212, and Data bits [31:0] 214. Values in R/W bits 210 go to AND gate 216, as do Sync circuit 216 output and CU_trustedDebug input 220. JTAG_isdb_chain_update tkl signal 222 and ISDB_CLK signal 224 control the operation of Sync circuit 218. Address information from Address bits 212 may be received by Address Decode circuit 220, which feeds ISDB Registers 204. ISDB Registers 204 transfers data with Data bits [31:0] in response to a write_enable signal 228 from AND gate 216.

FIG. 8 illustrates one way of forming a digital signal processor system configuration register for providing the trusted/untrusted debugging operations herein described. Specifically, system configuration or SYSCFG register 230 includes reserved bits 232 in conjunction with ISDB core ready bit 234, interrupts bit 236, ISDB trusted bit 238, Dcache bit 240, Icache bit 242, and MMU bit 244. Although there may be numerous forms of a SYSCFG register 230, ISDB trusted bit 238 is relevant for the present disclosure. In operation, ISDB 82 communicates with the test environment, such as a debugger interface card communicating with debugging software through JTAG interface 84. The host debugger software interacts with ISDB 82 by reading and writing ISDB control registers 234 through 238.

Communication through a SYSCFG register 230 as a 40-bit packet identifies the ISDB register to read/write and a 32-bit data payload. This packet format supports up to 64 control registers which can be 32 bits wide each. The valid bit of a particular register indicates the data portion to be valid or not. On a control register read or write, JTAG interface 84 returns an invalid value if the core is powered off, in the process of powering up/down, if access is not currently permitted to the specified register, or if the specified register is reserved.

SYSCFG register 230 is a supervisor only control register. Interacting with ISDB 82, ISDB core ready bits 234 indicate whether core processor 70 of DSP 40 is ready to interact with the host debugger. All JTAG register reads and writes may return an invalid status until the ISDB core ready bit 234 is set (i.e., has a value 1).

ISDB trusted bit 238 controls security such that if ISDB trusted bit 238 is set (i.e., has value 1), then all ISDB registers are visible to the debugger software, and all ISDB commands are available for use. In the case that ISDB_TRUSTED is cleared (i.e., value 0), then ISDB only permits a restricted set of operations. Only the core processor 70 operation system may set ISDB trusted bit 238.

FIG. 9 provides table 250, which lists the ISDB control registers that the present implementation may access by the debugger host software via JTAG interface 84. ISDB 82 operates such that debug commands are sent to a debug monitor program that works together with the core processor 70 operating system to debug applications while having full understanding of security issues. For example, in untrusted mode, ISDB 82 allows the debugger host software to (a) read the value of the ISDB mailbox status bits in ISDBST; (b) read/write mailbox (ISDBMBXIN and ISDBMBXOUT) registers; (c) write the ISDBCMD command register, but only the interrupt command; and (d) access the ISDB Enable and ISDB Version registers. All other ISDB 82 registers, bits, and commands are not accessible.

As an example of how the present implementation may might work, consider how a breakpoint could be set. The host debugger software puts a command in the mailbox "set breakpoint". The host debugger software would then raise the debugger interrupt. Then, the core processor 70 operating system may take the interrupt, sees the command, and acknowledges it with a response in the outgoing mailbox. The host debugger software then may proceed to give more information such as PC, and thread name. These bits of information are received and acknowledged via the mailbox/interrupt mechanism. The core processor 70 operating system, once it verifies that the user is allowed to set this breakpoint, may set a software TRAP at the desired point. Once the breakpoint is hit, it may trap to the core processor 70 operating system, whereby the core processor 70 operating system can send a mailbox message to ISDB that the breakpoint was hit.

In summary, the disclosed subject matter provides a method and system for controlling debugging operations for trusted and untrusted user and includes steps, circuitry, and instructions for operating a core processor process within core processor 70 and a debugging process 150 within a debugging mechanism of the digital signal processor, the debugging mechanism associated with the core processor. Core processor 70 determines the origin of debugging control as trusted debugging control or untrusted debugging control. In the event that debugging control is trusted debugging control, the trusted debugging control is provided a first set of features and privileges. Alternatively, in the event that debugging control is untrusted debugging control, the untrusted debugging control is provided a second restricted set of features and privileges. Accordingly, the present disclosure maintains security in the operating of the core processor process according to the determination of the debugging control as untrusted debugging control or untrusted debugging control.

The processing features and functions described herein for trusted and untrusted non-intrusive, thread-selective, debugging in a multi-threaded digital signal processor may be implemented in various manners. For example, not only may DSP 40 perform the above-described operations, but also the present embodiments may be implemented in an application specific integrated circuit (ASIC), a microcontroller, a digital signal processor, or other electronic circuits designed to perform the functions described herein. Moreover, the process and features here described may be stored in magnetic, optical, or other recording media for reading and execution by such various signal and instruction processing systems. The foregoing description of the preferred embodiments, therefore, is provided to enable any person skilled in the art to make or use the claimed subject matter. Various modifications to these embodiments will be readily apparent to those skilled in the art, and the generic principles defined herein may be applied to other embodiments without the use of the innovative faculty. Thus, the claimed subject matter is not intended to be limited to the embodiments shown herein but is to be accorded the widest scope consistent with the principles and novel features disclosed herein.

What is claimed is:

1. A method, comprising:
    determining a debug mode of one or more threads of a multi-threaded processor based on a trust value stored at a system configuration register; and
    providing a first set of debugging features and privileges when the debug mode is a first debug mode and a second set of debugging features and privileges when the debug mode is a second debug mode,
    wherein providing the first set of debugging features and privileges includes granting unrestricted write control for a debugging command register, and
    wherein providing the second set of debugging features and privileges includes restricting writing any command to the debugging command register other than an interrupt command.

2. The method of claim 1, wherein each of a plurality of threads is debugged independently of other threads of the plurality of threads.

3. The method of claim 1, wherein the first debug mode is entered when a bit of the system configuration register indicates the trust value as trusted, and wherein the second debug mode is entered when the bit indicates the trust value untrusted.

4. The method of claim 3, wherein the first set of debugging features and privileges includes read/write control for non-intrusive debugging configuration registers.

5. The method of claim 3, wherein the first set of debugging features and privileges includes write control for debugging breakpoint configuration registers.

6. The method of claim 3, wherein the first set of debugging features and privileges includes write control for debugging breakpoint address registers.

7. The method of claim 3, wherein the first set of debugging features and privileges includes write control for instruction stuffing registers.

8. The method of claim 3, wherein the first set of debugging features and privileges and the second set of debugging features and privileges include read/write control for a mailbox for debugging mechanism registers.

9. The method of claim 3, wherein the first set of debugging features and privilege includes read/write control for debugging mechanism general purpose registers.

10. The method of claim 3, wherein the first set of debugging features and privileges and the second set of debugging features and privileges include read control for debugging mechanism enable registers.

11. The method of claim 3, wherein the trust value is set by an operating system.

12. The method of claim 1, wherein the one or more threads are each configured to operate in a plurality of modes including a wait non-processing mode and a debug non-processing mode, and wherein the one or more threads are each operable to transition between the debug non-processing mode and the wait non-processing mode.

13. The method of claim 12, wherein the plurality of modes further include a user processing mode, a supervisor processing mode, and an off non-processing mode.

14. The method of claim 13, wherein the one or more threads are each operable to transition between the debug non-processing mode an any mode of the plurality of modes other than the off non-processing mode, and wherein a particular thread of the one or more threads is powered down in response to receiving a breakpoint while the particular thread is operating in the off non-processing mode.

15. The method of claim 1, wherein providing the second set of debugging features and privileges further includes restricting access to debugging configuration registers, breakpoint registers, and a stuff instruction register, granting read control to a mailbox-in register, granting write control to a mailbox-out register, granting read/write control to a debugging enable register, granting read control to a debugging version register, and restricting access to a debugging general purpose register.

16. A system comprising:
a system configuration register having a core processor control bit, the core processor control bit operative to determine a debug mode of one or more threads of a multi-threaded processor; and
instructions for providing a first set of debugging features and privileges when the debug mode is a first debug mode and a second set of debugging features and privileges when the debug mode is a second debug mode,
wherein the instructions for providing the first set of debugging features and privileges include instructions for granting unrestricted write control for a debugging command register, and
wherein the instructions for providing the second set of debugging features and privileges include instructions for restricting writing any command to the debugging command register other than an interrupt command.

17. The system of claim 16, wherein the first debug mode is entered when the core processor control bit indicates a trust value as trusted, and wherein the second debug mode is entered when the core processor control bit indicates the trust value as untrusted.

18. The system of claim 17, further comprising circuitry and instructions for providing read/write control for non-intrusive debugging configuration registers in the first debug mode.

19. The system of claim 17, further comprising circuitry and instructions for providing write control for debugging breakpoint configuration registers in the first debug mode.

20. The system of claim 17, further comprising circuitry and instructions for providing write control for debugging breakpoint address registers in the first debug mode.

21. The system of claim 17, further comprising circuitry and instructions for providing write control for instruction stuffing registers in the first debug mode.

22. The system of claim 17, further comprising circuitry and instructions for providing read/write control for mailbox to debugging mechanism registers in the first debug mode and in the second debug mode.

23. The system of claim 17, further comprising circuitry and instructions for providing read/write control for debugging mechanism general purpose registers in the first debug mode.

24. The system of claim 17, further comprising circuitry and instructions for providing read control for debugging mechanism enable registers in the first debug mode and in the second debug mode.

25. The system of claim 17, wherein the core processor control bit is set by an operating system.

26. A multi-threaded digital signal processor comprising:
means for determining a debug mode of one or more threads of a multi-threaded processor based on a trust value stored at a system configuration register; and
means for providing a first set of debugging features and privileges when the debug mode is a first debug mode and a second set of debugging features and privileges when the debug mode is a second debug mode,
wherein the means for providing the first set of debugging features and privileges include means for granting unrestricted write control for a debugging command register, and
wherein the means for providing the second set of debugging features and privileges include means for restricting writing any command to the debugging command register other than an interrupt command.

27. The multi-threaded digital signal processor of claim 26, wherein the first debug mode is entered when a bit of the system configuration register indicates the trust value as trusted, and wherein the second debug mode is entered when the bit indicates the trust value as untrusted.

28. The multi-threaded digital signal processor of claim 27, further comprising means for providing read/write control for non-intrusive debugging configuration registers in the first debug mode.

29. The mufti-threaded digital signal processor of claim 27, further comprising means for providing write control for debugging breakpoint configuration registers in the first debug mode.

30. A non-transitory computer usable medium having computer readable program code means embodied therein for processing instructions on a multi-threaded digital signal processor for debugging the multi-threaded digital signal processor, the computer usable medium comprising:
computer readable program code means for determining a debug mode of one or more threads of a multi-threaded processor based on a trust value stored at a system configuration register; and
computer readable program code means for providing a first set of debugging features and privileges when the debug mode is a first debug mode and a second set of debugging features and privileges when the debug mode is a second debug mode,
wherein the computer readable program code means for providing the first set of debugging features and privileges include computer readable program code means for granting unrestricted write control for a debug in command register, and
wherein the computer readable program code means for providing the second set of debugging features and privileges include computer readable program code means for restricting writing any command to the debugging command register other than an interrupt command.

* * * * *